April 1, 1969  P. S. SAMMIS  3,435,555
TOY BIRD
Filed April 4, 1967
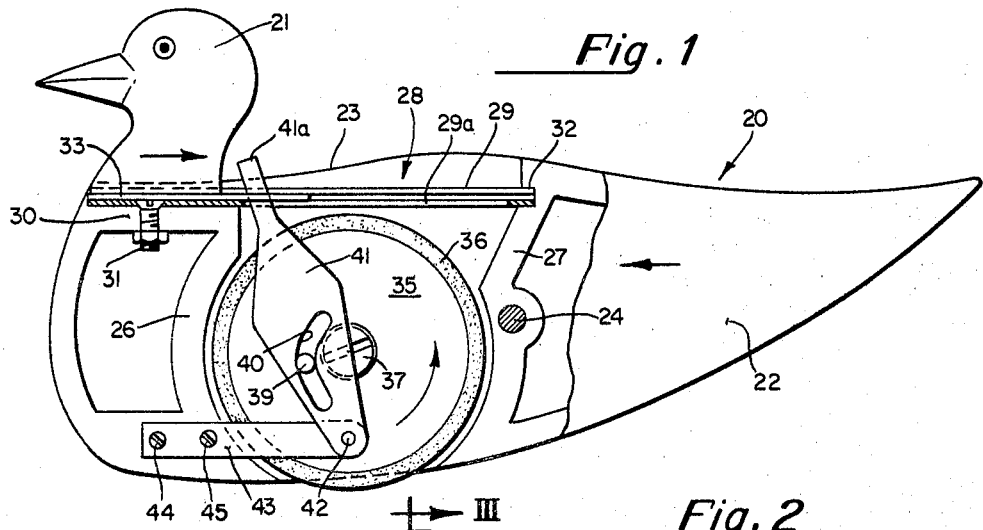
Fig. 1
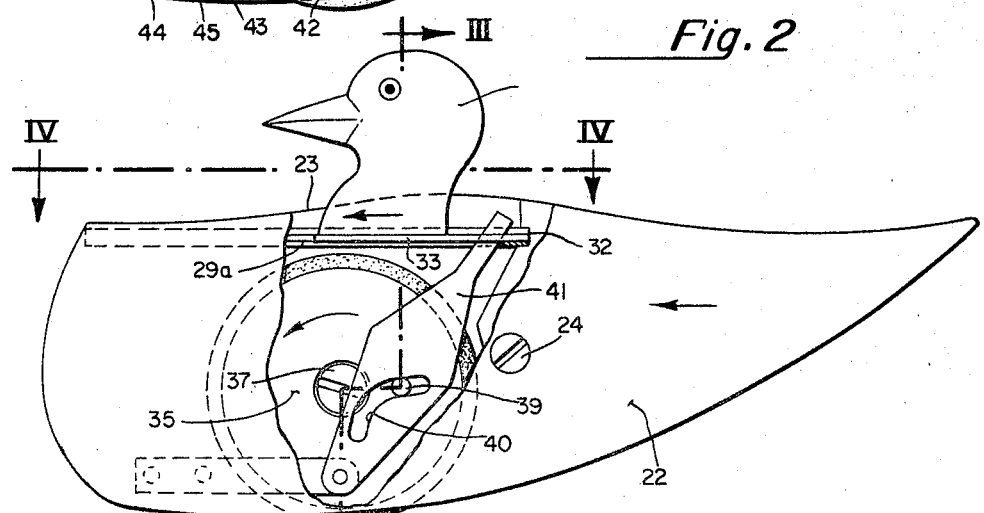
Fig. 2
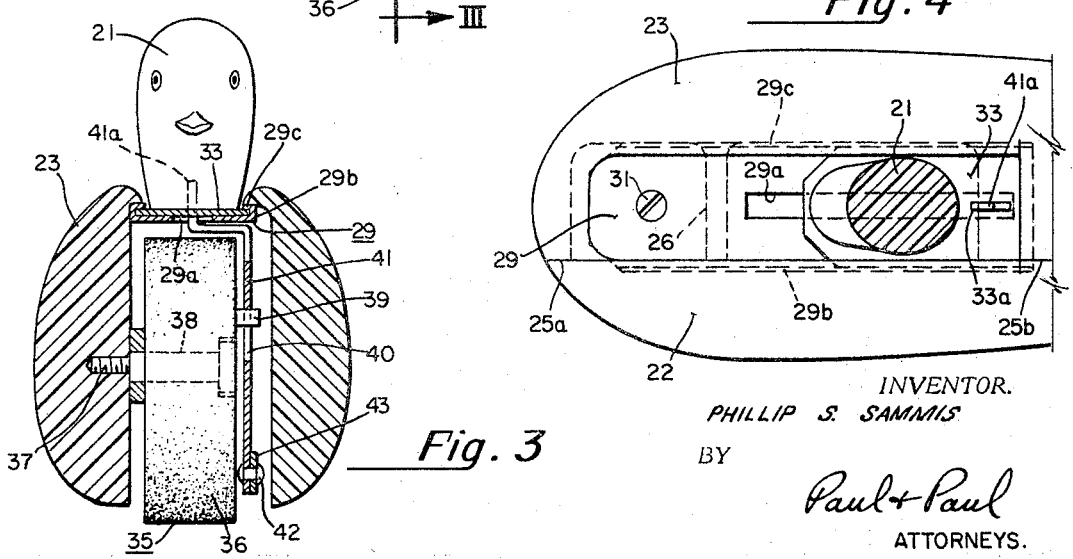
Fig. 3
Fig. 4
INVENTOR.
PHILLIP S. SAMMIS
BY
Paul & Paul
ATTORNEYS.

United States Patent Office 3,435,555
Patented Apr. 1, 1969

3,435,555
TOY BIRD
Phillip S. Sammis, 300 S. 41st St.,
Philadelphia, Pa. 19104
Filed Apr. 4, 1967, Ser. No. 628,328
Int. Cl. A63h 11/10
U.S. Cl. 46—104      4 Claims

ABSTRACT OF THE DISCLOSURE

A toy bird, the head of which is moved in a reciprocating fashion longitudinally of the body by means of a lever actuated by an eccentric on a wheel which is turned when the bird is pushed along a surface.

Summary

The purpose of this invention is to provide a mechanical toy bird wherein the head of the bird is caused to move in a reciprocating fashion as the bird is pushed along the floor or other surface. The purpose of the present design is to stimulate the "locking in" motion of a live bird wherein the head stays fixed in relation to the ground as the body moves into position under the head. This allows the eyes to stay focused on a particular object while the body moves. Then, after the head is moved forward to a new position, it remains fixed as the body moves up under the head again. This procedure is repeated as the bird moves forward over the ground.

In the present invention, the "locking in" motion of a live bird is simulated by longitudinal reciprocal movement of the head of the toy as the body of the toy is pushed along a surface.

Although there are examples in the prior art of toy birds having moving heads, e.g., U.S. Patents 581,420 and 1,460,616, none of these are capable of simulating the locking in action of a live bird which is obtained with the present invention.

The drawings

This invention will be more fully understood with reference to the drawing wherein:

FIG. 1 is a side elevation of the toy wherein the near side of the body is cut away to disclose details of the inner mechanism and the position of the elements thereof when the head of the bird is in the forward position;

FIG. 2 is a side elevation of the bird taken from the same side as FIG. 1 wherein the near side of the body is cut away to disclose details of the interior mechanism and the position of the elements thereof when the head is in the rear or retracted position;

FIG. 3 is a sectional view taken along the lines III—III of FIG. 2;

FIG. 4 is a top view of the bird taken along the lines IV—IV of FIG. 2.

Detailed description

The toy has a body 20 and a movable head 21 and is preferably molded plastic. Of course, a variety of other materials and shaping techniques may be used.

The body 20 comprises two sections, 22 and 23, which by means of a screw 24, are held in flush fitting relationship at the front and rear along seams 25a and 25b. As indicated in FIG. 4, section 23 is about twice the width of section 22 and, as best shown in FIG. 1, is formed transverse ribs 26 and 27 which define a cavity 28. Cavity 28, which is at about the middle of the body, is open at top and bottom.

As indicated in the drawings, channel member or track 29 is fitted over the top opening of cavity 28. Track 29 is secured to a horizontal extension 30 of body section 23 by a bolt 31. The rear of track 29 is supported within a groove 32 cut into rib 27.

At each side, track 29 has a groove or channel formed by an upstanding wall 29b and an overhanging lip 29c. It will be noted that the portion of track 29 which is above cavity 28 has a longitudinal slot 29a.

The head 21 of the bird is glued or otherwise suitably bonded to a flat metal plate 33. Plate 33, which may be termed a slide or head plate, is about half as long as track 29 and is wide enough so that its opposed edges are slidably engaged within the grooves at either side of track 29.

The mechanism for moving the head plate 33 back and forth in track 29 to provide the longitudinally reciprocating motion of the head 21 is as follows.

A wheel 35 having a rubber or other suitable high friction surface 36 is rotatably mounted within cavity 28 by means of a screw 37 which passes through the axial sleeve 38 of the wheel and is secured to body section 23. As shown in FIGS. 1–3, the axis of the wheel 25 is positioned so that the lower portion of the wheel depends through the bottom opening of cavity 28 and is thus lower than the bottom of the bird. Thus, as the bird is pushed forward along the floor, the friction between the floor and the surface 36 of the wheel 35 will cause the wheel to move counterclockwise, as indicated by the arrows in FIGS. 1 and 2.

A crank pin 39 is mounted eccentrically of the axis of the wheel and protrudes through a slot 40 in a lever 41. Lever 41 has a reduced upper end 41a which projects through slot 29a in track 29 into slot 33a in sliding plate 33. Lever 41 is pivotally connected by a pin 42 to a horizontal bracket 43 which is secured to body section 23 by screws 44 and 45.

The operation of the toy is as follows. As the toy is pushed in a forward direction, wheel 35 turns in a counterclockwise direction and the corresponding movement of the crank pin 39 causes the upper end 41a of the lever 41 to move back and forth within slot 29a of track 29. Since lever 41 is connected to plate 33 via tip 41a engaging slot 33a, the reciprocal motion of lever 41 is transmitted to reciprocate plate 33 longitudinally of track 29. Thus, when lever 41 is in the forward position shown in FIG. 1, head 21 is also in a forward position. Conversely, when lever 41 is in the rear position shown in FIGS. 2 and 4, head 21 is also retracted to the rear of the body. Accordingly, the movement of the head of this toy bird simulates the "locking in" action of a live bird.

The construction and/or design of this invention can be varied in several respects without departing from the scope of the claims. For example, the head of the bird may be molded with an integral plastic plate in lieu of the metal plate 33 illustrated herein. Also, in lieu of a separate track 29, the body sections 22 and 23 can be formed with longitudinal grooves for receiving the plate 33.

Furthermore, it is to be clearly understood that the terms and expressions used herein are employed in a descriptive sense, and not as terms of limitation, and that I have no intention of using such terms and expressions to exclude any equivalents. Furthermore, as indicated, it is to be clearly understood that what is specifically shown and described herein represents a preferred embodiment of the invention, and that various modifications are possible within the scope of the claims.

Having thus described my invention, I claim:
1. A toy bird comprising, in combination:
 (a) a body having a hollow cavity and means forming spaced apart opposing substantially horizontal grooves above said cavity,

(b) a head having a base portion slidable within said grooves,
(c) a rotatable member mounted within said hollow cavity, and
(d) means operatively connecting said rotatable member to said head whereby, as the rotatable member is turned, the head is moved back and forth within said horizontal grooves said grooves limiting the movement of said head to a substantially horizontal path.

2. The invention of claim 1 wherein the rotatable member comprises a wheel which is mounted so that a portion thereof depends below the bottom of the body whereby the wheel is turned by frictional engagement as the body is pushed along a surface.

3. The invention of claim 2 wherein the wheel has an eccentric pin and wherein the means operatively connecting the wheel to the head includes a lever which is moved longitudinally of the body in reciprocal fashion by the pin as the wheel is turned.

4. The invention of claim 3 wherein the means forming the grooves at the top of the body is a track member having a longitudinal slot therein for the passage of the lever during reciprocal movement.

References Cited

UNITED STATES PATENTS

| | | | |
|---|---|---|---|
| 581,420 | 4/1897 | Henriksen | 46—118 |
| 1,460,616 | 7/1923 | Starbuck | 46—104 |
| 1,882,595 | 10/1932 | Hewitt | 46—98 |
| 2,504,432 | 4/1950 | Looney | 46—104 XR |

FOREIGN PATENTS

| | | |
|---|---|---|
| 6,979 | 1/1956 | Germany. |

LOUIS G. MANCENE, *Primary Examiner.*

H. DINITZ, *Assistant Examiner.*